United States Patent [19]

Kumai

[11] Patent Number: 4,626,084
[45] Date of Patent: Dec. 2, 1986

[54] ELECTRICALLY FOLDABLE DOOR MIRROR

[75] Inventor: Toshiyuki Kumai, Shizuoka, Japan

[73] Assignee: Murakami Kaimeido Co., Ltd., Shizuoki, Japan

[21] Appl. No.: 745,664

[22] Filed: Jun. 17, 1985

[30] Foreign Application Priority Data

Jun. 28, 1984 [JP] Japan .................................. 59-131995

[51] Int. Cl.$^4$ .............................................. G02B 7/18
[52] U.S. Cl. .................................................. 350/604
[58] Field of Search ............... 350/604, 605, 606, 632, 350/633, 637; 248/480

[56] References Cited

U.S. PATENT DOCUMENTS

| | | | |
|---|---|---|---|
| 3,937,563 | 2/1976 | Frabe | 248/480 X |
| 4,158,483 | 6/1979 | Fisher et al. | 350/633 X |
| 4,380,370 | 4/1983 | Mittelhauser | 248/475.1 X |
| 4,464,017 | 8/1984 | Wada | 350/604 |
| 4,504,116 | 3/1985 | Sharp | 350/637 |
| 4,558,930 | 12/1985 | Deedreek | 350/604 |

Primary Examiner—Donald Watkins
Attorney, Agent, or Firm—Michael J. Striker

[57] ABSTRACT

An electrically foldable door mirror comprising a base, a shaft erected on said base, a mirror body rotatably attached to said shaft, electric driving means supported by a frame within said mirror body, a pinion secured to the output shaft of said electric driving means, said pinion being engaged with a clutch gear attached to the upper portion of said shaft, an upper clutch disposed between the upper surface of said clutch gear and the upper end of said shaft, a lower clutch disposed between the lower surface of said frame at the position of insertion of said shaft and the opposing surface of said base, a coiled spring provided around said shaft so as to give a force of engagement to both of said clutches, said upper clutch being more strongly engaged than said lower clutch so that said lower clutch is disengaged earlier when said mirror body is turned. The door mirror of the invention can be folded forward or backward both by remote control from inside the motor vehicle and by manual operation. The door mirror is smoothly folded also when it receives an external shock.

4 Claims, 10 Drawing Figures

ELECTRICALLY FOLDABLE DOOR MIRROR

BACKGROUND OF THE INVENTION

1. Field of the Invention

The present invention relates to an electrically foldable door mirror for a motor vehicle. More particularly, the invention relates to a door mirror which can be folded forward or backward both by remote control from inside the motor vehicle and by manual operation, said door mirror being smoothly folded also when it receives an external shock.

2. Description of the Prior Art

In conventional door mirrors, the mirror body is attached to its base by means of a coiled spring, etc. so that the mirror body turns forward or backward when the door mirror receives a strong external force, in order to weaken the shock and ensure safety. However, because the door mirror protrudes sideways from the vehicle body more than the fender mirror, the door mirror offers problems when a motor vehicle equipped therewith is parked in a narrow space or transported. Particularly when a motor vehicle equipped with door mirrors enters a three-dimensional car park, the door mirrors may hit a side wall, iron frame, etc. of the car park and do damage thereto as well as to the door mirrors themselves. Some known door mirrors can be kept in a folded state within the outermost line of the vehicle body in order to prevent the aforesaid problems. For example, the door mirrors are mechanically kept in a folded state by means of an engaging catch, etc. provided in a mirror folding mechanism.

In conventional foldable door mirrors, the vehicle driver has to get out of the vehicle each time he folds them or return them to their normal positions. With a view to preventing such a trouble, Japanese Patent Application No. Sho 58-247796 has provided a door mirror, containing an electric motor and gears within its mirror body, which can be electrically folded by remote control from inside the motor vehicle. Since this door mirror has only one ball clutch in a pivot shaft, it has the disadvantage that the gears receive an excessive load and the mirror body does not smoothly turn when it is folded by hand or by other external force.

BRIEF SUMMARY OF INVENTION

It is an object of the present invention to provide an electrically foldable door mirror which can be folded forward or backward by remote control from inside the motor vehicle, said door mirror being foldable easily and surely also by hand or by an external shock.

It is another object of the invention to provide an electrically foldable door mirror which can be folded forward or backward not only to a desired angle but also to the very limit just before contacting the outer panel of a motor vehicle, and maintained in such a state.

These and other objects have been achieved by a door mirror comprising a base and a mirror body, said mirror body containing electric driving means, the output shaft of said means being provided with a pinion, said pinion being engaged with a clutch gear attached to the upper portion of a shaft on which said mirror body turns, an upper clutch being disposed between the upper surface of said clutch gear and the upper end of said shaft, a lower clutch being disposed between the lower surface of a frame at the position of insertion of said shaft and the opposing surface of said base, a coiled spring being provided around said shaft so as to give a force of engagement to both of said clutches, said upper clutch being more strongly engaged than said lower clutch so that said lower clutch is disengaged earlier than said upper clutch when said mirror body is turned.

Thus, in the present invention, when the door mirror is electrically folded, the rotation of the pinion is transmitted to the clutch gear, and only the lower clutch is disengaged because the clutch gear is strongly connected with the shaft through the intermediary of the upper clutch. As a result, the frame is turned in relation to the shaft, and the mirror body is automatically turned forward or backward. At the time of manual operation, the upper clutch is disengaged after the lower clutch, and the mirror body can be turned to a desired angle. When the mirror body receives a shock, both of the upper and lower clutches are disengaged at the same time, and the mirror body is turned. Whether the mirror body is turned by hand or by other external force, the gears do not receive any load and they are free from troubles.

DETAILED DESCRIPTION

Figure 1:
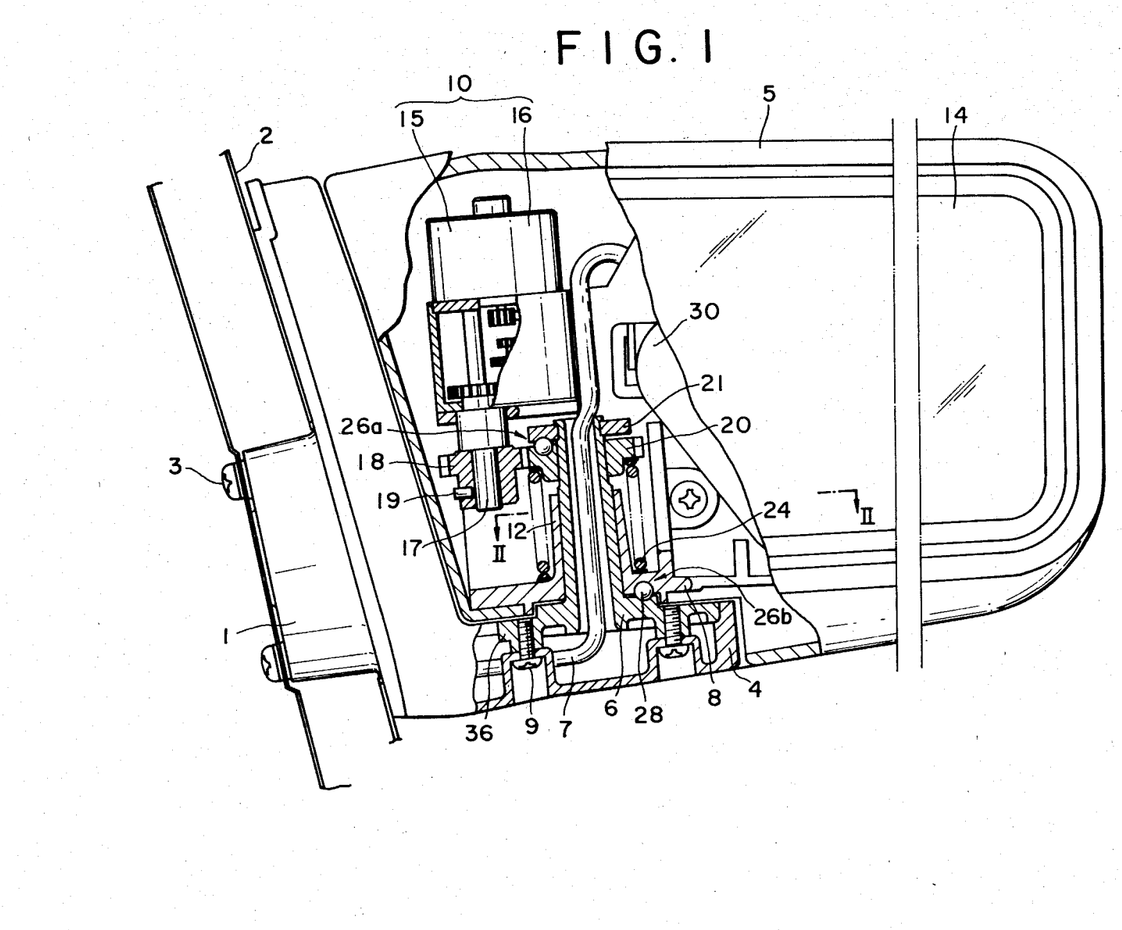
FIG. 1 is a partially cutaway front view of an electrically foldable door mirror according to the present invention.
Figure 2:
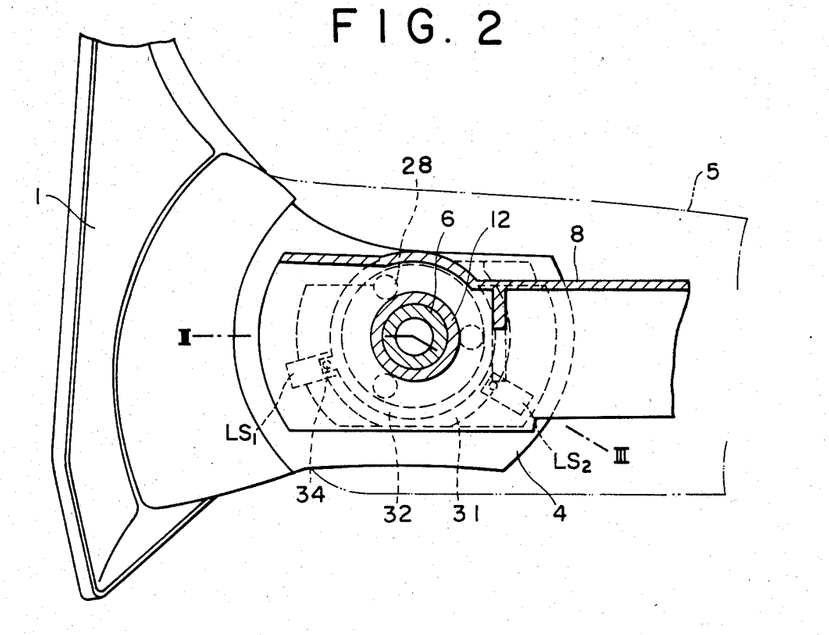
FIG. 2 is a sectional plan view taken on line II—II of FIG. 1.

In the present invention, as shown in FIGS. 1 and 2, electric driving means 10, such as a DC electric motor with reduction gears, is disposed within a mirror body 5, a pinion 18 being fastened to the output shaft of said electric driving means 10, said pinion 18 being engaged with a clutch gear 20 attached to the upper portion of a shaft 6, an upper clutch 26a being disposed between the upper surface of said clutch gear 20 and the upper end of said shaft 6, a lower clutch 26b being disposed between the lower surface of a frame at the position of insertion of said shaft 6 and the opposing surface of a base, a coiled spring 24 being provided around said shaft 6 so as to give a force of engagement to both of said clutches 26a, 26b, said upper clutch 26a being slightly more strongly engaged than said lower clutch 26b. When the door mirror is electrically folded, the rotation of the pinion 18 disengages the weakly engaged lower clutch 26b so that the mirror body 5 can be turned. In manual operation, when the mirror body 5 is forcibly turned by hand, the lower clutch 26b is disengaged and then the upper clutch 26a is disengaged so that the mirror body 5 can be turned, because the pinion 18 is engaged with the clutch gear 20. When the mirror body 5 receives an external shock, both the upper and lower clutches 26a, 26b are disengaged at the same time so that the mirror body 5 can be turned. In this way, the clutches 26a, 26b are adapted to operate effectively according to the force exerted on the mirror body 5.

Parts of the door mirror will now be described in detail. In FIGS. 1 and 2, numeral 1 represents a base fastened, for example, to the triangular corner 2 of a door window of a motor vehicle by means of screws 3. Numeral 4 represents a bracket extending approximately horizontally from the lower portion of the base 1. Numeral 5 represents a mirror body. Numeral 6 represents a shaft erected on the bracket 4.

Since the mirror body 5 illustrated in FIG. 1 contains an acutator 30 for changing the angle of reffection of the mirror, the shaft 6 has a central hole through which a harness 7 passes. When the mirror body 5 does not contain such an actuator, the shaft 6 is not required to be hollow. In FIG. 1, the shaft 6 is a member separate from the base 1, and is secured thereto at its root portion 36 by means of screws 9. However, the shaft 6 may be formed integrally with the base 1, and in this case securing by means of screws is eliminated.

A frame 8 is secured within the mirror body 5, and said actuator 30 is disposed approximately in the center of the frame 8. The frame 8 supports, near the base 1, electric driving means 10 which gives a driving force for the folding operation of the door mirror, and the frame 8 has a shaft bearing 12 into which the shaft 6 is inserted. The electric driving means 10 comprises a DC electric motor 15 and a gear box 16 containing reduction gears. A pinion 18 is secured to the output shaft 17 of the gear box 16. In FIG. 1, the pinion 18 is secured to the output shaft 17 by means of a pin 19. Alternatively the pinion 18 may be secured thereto by press fit or by means of a key and a key way.

Figure 6:
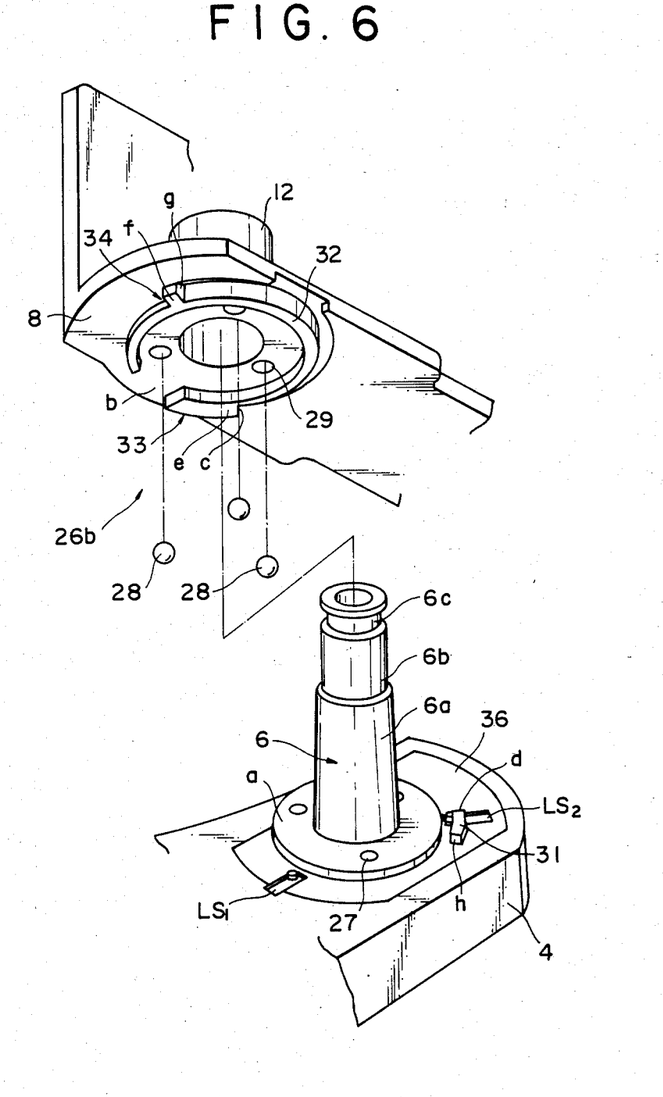
FIG. 6 is an exploded view showing the relation between a shaft on a base and a mirror body.

As shown in FIG. 6, the shaft bearing 12 of the frame 8 is slightly tapered, and the shaft 6 has a taper portion 6a corresponding thereto. When the shaft bearing 12 of the frame 8 is put on the taper portion 6a of the shaft 6, the whole frame 8 is rotatable and axially slidable with relation to the shaft 6.

Figure 7:
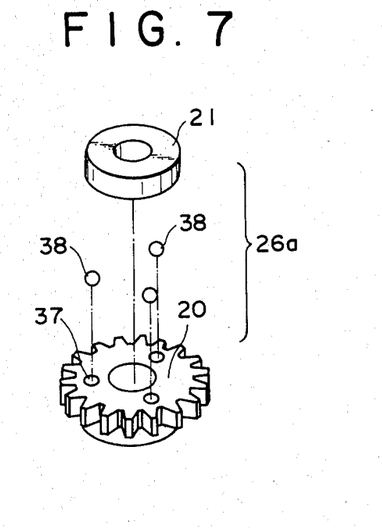
FIG. 7 is a perspective view showing a fixed clutch and a clutch gear.
Figure 8:
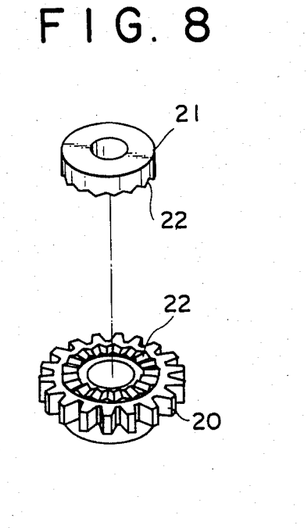
FIGS. 8 and 9 are perspective views showing modified examples of FIG. 7.
Figure 9:
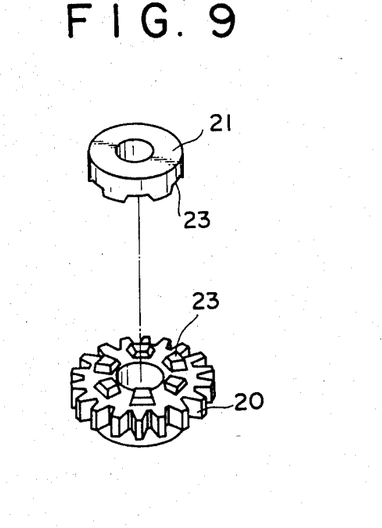

The shaft 6 has a cylindrical portion 6b above said taper portion 6a, and a clutch gear 20 engaged with said pinion 18 is attached to the cylindrical portion 6b. The shaft 6 has a narrow portion 6c above said cylindrical portion 6b, and a fixed clutch 21 is fixed to the narrow portion 6c. The opposing surfaces of the clutch gear 20 and the fixed clutch 21 form an upper clutch 26a. The upper clutch 26a may be, as shown in FIG. 7, a ball clutch comprising a plurality of (three in FIG. 7) holes 37 respectively provided in the upper surface of the clutch gear 20 and the lower surface of the fixed clutch 21, and balls 38 fitted in said holes 37. Alternatively the upper clutch 26a may comprise sidge-shaped catches 22 (FIG. 8) or tooth-shaped catches 23 (FIG. 9).

A coiled spring 24 is disposed around the shaft bearing 12 so as to give a force of engagement to both of said upper clutch 26a and a lower clutch 26b described below.

As shown in FIG. 6, the lower clutch 26b is a ball clutch comprising holes 27, 29 provided in a plurality of (three, for example) positions on a circle both on a surface (a) around the root portion of the shaft 6 and a corresponding surface (b) of the frame 8, and balls 28 fitted in said holes 27, 29. The engagement of the lower clutch 26b is made weaker than that of the upper clutch 26a by, for example, fitting the balls 28 of the lower clutch 26b more shallowly in the holes or making the balls 28 larger, as compared with the balls 38 of the upper clutch 26a. Thus, for example when the mirror body 5 is turned by hand, the lower clutch 26b is disengaged slightly earlier than the upper clutch 26a so that the mirror body 5 can be turned smoothly.

According to the present invention, it is possible not only to turn the mirror body 5 to a desired angle by automatic operation, manual operation, etc. but also to set the limits of turning of the mirror body 5 as defined by claim 2 in order to prevent damage to the outer panel of the vehicle.

For this purpose, the door mirror of the invention has stopping means and detecting means. The stopping means comprises, as shown in FIG. 6, a stopper 31 disposed outside the surface (a) around the root portion of the shaft 6, and projections 33, 34 provided at suitably angularly separated positions on the outside of a segmental projection 32 formed on the surface (b) of the frame 8. Thereby, the stopping means mechanically sets the limits of turning of the mirror body 5.

Figure 4:
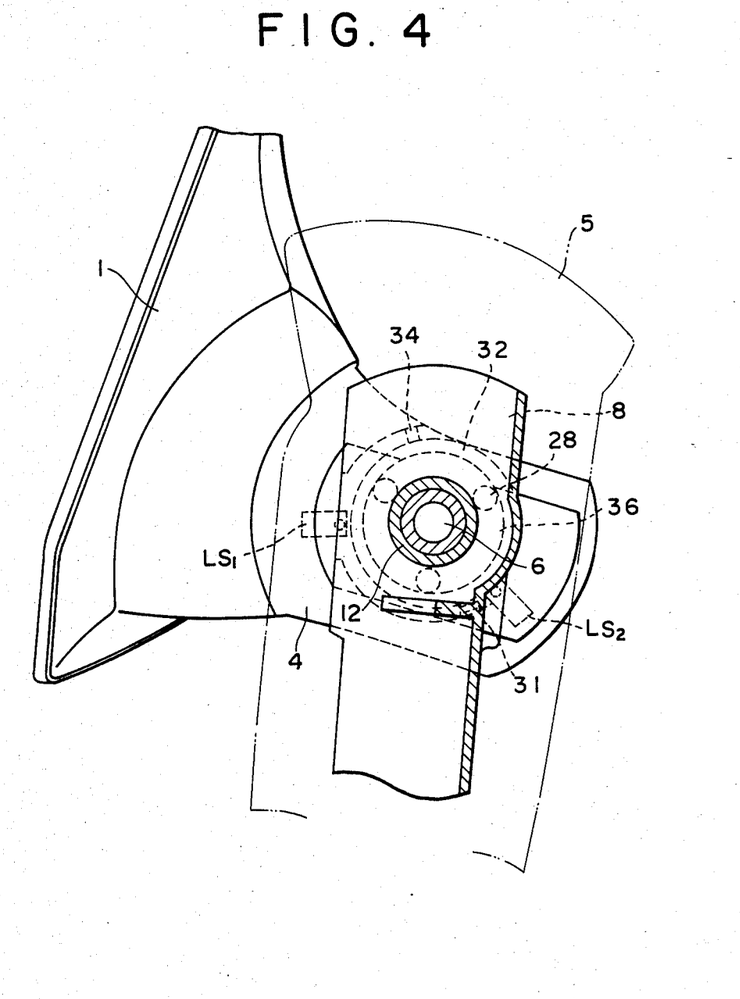
FIG. 4 is a cross-sectional plan view showing a portion of said door mirror folded backward.
Figure 5:
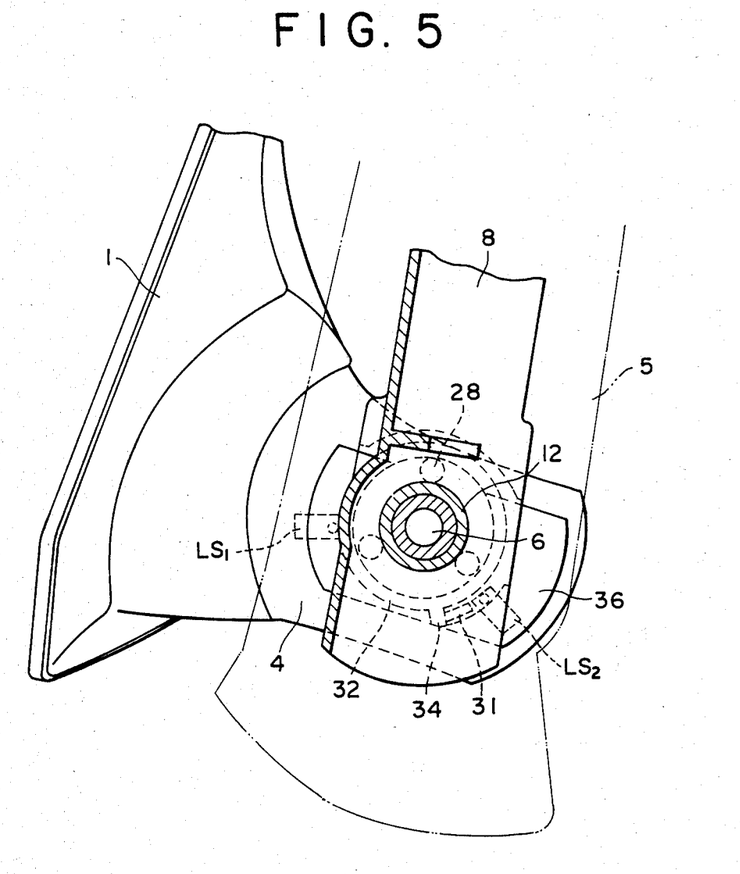
FIG. 5 is a cross-sectional plan view showing a portion of said door mirror folded forward.

The stopper 31 is disposed on the locus of turning of the projections 33, 34. Therefore, when the mirror body 5 is turned backward as shown in FIG. 4, the end (c) of the projection 33 contacts the end (d) of the stopper 31 so that the mirror body 5 cannot turn any more. When the mirror body 5 is turned forward as shown in FIG. 5, the end (g) of the other projection 34 contacts the end (h) of the stopper 31 so that the mirror body 5 cannot turn any more.

The detecting means comprises a limit switch $LS_1$ for detecting the normal position (neutral position) of the mirror body 5, and another limit switch $LS_2$ for detecting the position of the rear turning limit of the mirror body 5. The limit switch $LS_1$ is buried, near the base 1, beside the surface (a) as shown in FIG. 6. When the mirror body 5 is in the neutral position, the surface (f) of the projection 34 pushes down the plunger (not shown) of the limit switch $LS_1$ so as to actuate the limit switch $LS_1$. The limit switch $LS_2$ is buried beside the stopper 31 as shown in FIG. 6. When the mirror body 5 is turned backward to the limit as shown in FIG. 4, the surface (e) of the projection 33 pushes down the plunger of the limit switch $LS_2$ so as to actuate the limit switch $LS_2$. These limit switches $LS_1$, $LS_2$ are contained in the driving circuit of the DC electric motor 15. When any of the limit switches $LS_1$, $LS_2$ is actuated after the main switch is turned on, the DC electric motor 15 is stopped.

The operation of the door mirror will now be described.

I. Normal Position (Neutral Position)

FIGS. 1 and 2 show the state that the mirror body 5 is erected, that is, the mirror body 5 stays in the normal position. In this state, the upper clutch 26a and the lower clutch 26b are respectively engaged by the force of the coiled spring 24. Also, the surface (f) (FIG. 6) of the frame 8 is in contact with the limit switch $LS_1$ and the DC electric motor 15 is stopped.

The upper clutch 26a is slightly more strongly engaged than the lower clutch 26b as mentioned above. Therefore, when the door mirror is electrically folded, only the lower clutch 26b is disengaged and the engagement of the upper clutch 26a is maintained, thus the mirror body 5 being turned by the pinion 18 and the clutch gear 20. If the load becomes larger at this time, the upper clutch 26a is disengaged so that the mechanism driving the pinion 18 is not overloaded. When the door mirror is folded by hand, the lower clutch 26b is disengaged first, and then the upper clutch 26a is disengaged. When the door mirror receives an external shock, both upper clutch 26a and the lower clutch 26b are disengaged at the same time, and the mirror body 5 is turned by the external force. When the mirror body 5 is turned, it can be stopped at any angle within the limit of turning.

II. Folding by Automatic Operation

Torque required for disengaging the upper clutch 26a and the lower clutch 26b will be described first. The rotation of the DC electric motor 15 is slowed down by the gear box 16 and transmitted through the pinion 18 to the clutch gear 20 so as to cause relative rotation to the shaft bearing 12 into which the shaft 6 is inserted. If torque required for disengaging the upper clutch 26a is represented by "Ta" and torque required for disengaging the lower clutch 26b is represented by "Tb", then $$Ta > Tb$$

Said Tb is, in other words, the torque required for raising the balls 28 of the lower clutch 26b from the holes 27 around the root portion of the shaft 6 onto the surface (a) while the balls 28 are held in the holes 29 in the surface (b) of the frame 8. Therefore, within the range of this torque, the upper clutch 26a between the clutch gear 20 and the fixed clutch 21 is not disengaged. Thus, the clutch gear 20 is not rotated and the pinion 18 rotates both round the clutch 20 and on its axis (FIG. 10) so as to turn the mirror body 5.

Backward Folding

If the DC electric motor 15 is actuated when the mirror body 5 is in the neutral position, the frame 8 turns on the shaft 6 with the rotation of the pinion 18 because the clutch gear 20 is unrotatably engaged with the fixed clutch 21. If the DC electric motor 15 is stopped when the mirror body 5 is at a desired angle (for example, about 45°), the mirror body 5 is maintained in that position with the clutch gear 20 engaged with the pinion 18.

Figure 3:
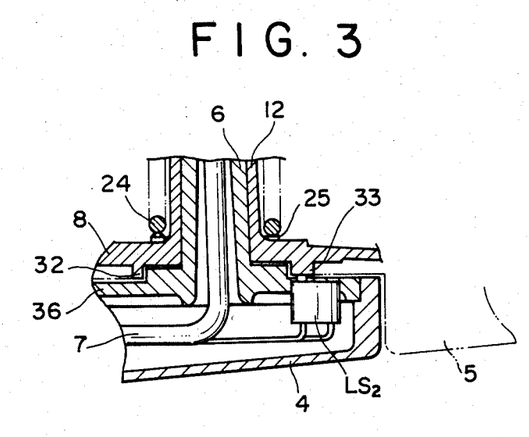
FIG. 3 is a vertical sectional view taken on line III—III of FIG. 2.

If it is necessary to turn the mirror body 5 further to the rear turning limit, the DC electric motor 15 is continued to be actuated to turn the mirror body 5 further. Then, the turning of the mirror body 5 is mechanically stopped when the end (c) of the projection 33 contacts the end (d) of the stopper 31, and at the same time the DC electric motor 15 is automatically deenergized because the surface (e) of the projection 33 pushes down the plunger of the limit switch $LS_2$ for detecting the position of the rear turning limit of the mirror body 5 (See FIG. 3.). Now the mirror body 5 is stopped at the position of the rear turning limit as shown in FIG. 4.

Returning to Neutral Position

Figure 10:
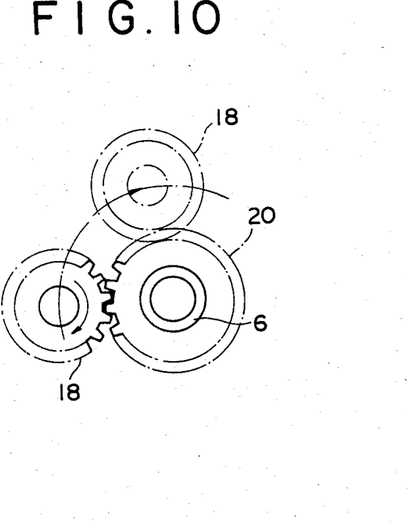
FIG. 10 is a plan view showing the relation between a pinion and said clutch gear.

If the DC electric motor 15 is reversed by means of the main switch when the mirror body 5 is in an arbitrary rear position or the position of the rear turning limit, the pinion 18 is rotated in the direction opposite to the direction shown in FIG. 10. This rotation of the pinion 18 turns the mirror body 5 until the balls 28 held in the holes 29 (FIG. 6) in the surface (b) of the frame 8 enter the holes 27 in the surface (a) around the shaft 6. At this time, the surface (f) of the projection 34 on the frame 8 pushes down the plunger of the limit switch $LS_1$ and the DC electric motor 15 is stopped thereby. In this way, the mirror body 5 is returned to the position shown in FIG. 2.

III. Folding by Manural Operation or External Shock

The door mirror receives different external forces and operates differently according as it is folded by manual operation or by external shock.

In manual operation, the pinion 18 engaged with the clutch gear 20 is rotated slowly, and in the meanwhile the weakly engaged lower clutch 26b is disengaged. Then, a thrust in the axial direction of the clutch gear 20 is produced by a tangential force exerted on the balls 38 (FIG. 7) or catches 22, 23 (FIGS. 8 and 9) of the upper clutch 26a. As a result, the clutch gear 20 is slightly pushed down along the cylindrical portion 6b and disengaged from the fixed clutch 21. Therefore, the mirror body 5 can be manually turned on the shaft 6.

If the mirror body 5 receives an external shock which is larger than said torque Ta for disengaging the upper clutch 26a when the motor vehicle is in operation or at a stop, both the upper clutch 26a and the lower clutch 26b are disengaged at the same time and the mirror body 5 is turned forward or backward.

The mirror body 5 in the neutral position can be turned forward to a desired position by hand. If the mirror body 5 is turned forward further, the end (g) of the projection 34 contacts the end (h) of the stopper 31 and therefore the mirror body 5 is stopped at the position of the front turning limit as shown in FIG. 5. If there is a limit switch (not shown) for detecting the position of the front turning limit, the mirror body 5 can be returned, by remote control, to the neutral position from the position of the front turning limit in the same way as from the position of the rear turning limit.

* Advantages of the Invention

According to the present invention, the mirror body can be turned forward or backward by remotely controlling the electric driving means contained in the mirror body. Since the pinion fixed to the output shaft of the electric driving means is engaged with the clutch gear attached to the upper portion of the shaft, the frame is given a relative rotation of the shaft and the mirror body is surely turned. The upper clutch is disposed between the upper surface of the clutch gear and the upper end of the shaft, and the lower clutch is disposed between the lower surface of the frame at the position of insertion of the shaft and the opposing surface of the base, said upper clutch being more strongly engaged than said lower clutch. Therefore, in automatic operation, only the lower clutch is disengaged, the engagement of the upper clutch being maintained, and the mirror body is turned by the pinion and the clutch gear. In manual operation, the upper clutch is disengaged after the lower clutch is disengaged, and therefore the mirror body can be stopped smoothly at a desired position. When the mirror body receives an external shock, both the upper clutch and the lower clutch are disengaged at the same time so that the mirror body is turned by the external force. Thus, the door mirror of the present invention has excellent performance.

What is claimed is:

1. An electrically foldable door mirror comprising a base, a shaft erected on said base, a mirror body rotatably attached to said shaft, electric driving means supported by a frame within said mirror body, a pinion secured to the output shaft of said electric driving means, said pinion being engaged with a clutch gear attached to the upper portion of said shaft, an upper clutch disposed between the upper surface of said clutch gear and the upper end of said shaft, a lower clutch disposed between the lower surface of said frame at the position of insertion of said shaft and the opposing surface of said base, a coiled spring provided around said shaft so as to give a force of engagement to both of said clutches, said upper clutch being more strongly engaged than said lower clutch so that said lower clutch is disengaged earlier when said mirror body is turned.

2. An electrically foldable door mirror comprising a base, a shaft erected on said base, a mirror body rotatably attached to said shaft, electric driving means supported by a frame within said mirror body, a pinion secured to the output shaft of said electric driving means, said pinion being engaged with a clutch gear attached to the upper portion of said shaft, an upper clutch disposed between the upper surface of said clutch gear and the upper end of said shaft, a lower clutch disposed between the lower surface of said frame at the position of insertion of said shaft and the opposing surface of said base, a coiled spring provided around said shaft so as to give a force of engagement to both of said clutches, said upper clutch being more strongly engaged than said lower clutch so that said lower clutch is disengaged earlier when said mirror body is turned, a limit switch provided near said base, beside said shaft, said limit switch being adapted to detect at least the normal position of said mirror body.

3. An electrically foldable door mirror as claimed in claim 1 or 2, wherein each of said upper clutch and said lower clutch comprises a plurality of balls being fitted in holes, and is adapted to make click action so that said mirror body can be turned by hand.

4. An electrically foldable door mirror as claimed in claim 1 or 2, wherein said upper clutch is adapted to be disengaged when the load becomes larger, so that a mechanism driving said pinion is not overloaded.

* * * * *